United States Patent

[11] 3,575,283

| [72] | Inventor | John D. Curran |
| | | Chardon, Ohio |
| [21] | Appl. No. | 797,030 |
| [22] | Filed | Feb. 6, 1969 |
| [45] | Patented | Apr. 20, 1971 |
| [73] | Assignee | W. S. Tyler, Incorporated |
| | | Mentor, Ohio |

[54] BELT GUIDE
13 Claims, 5 Drawing Figs.

| [52] | U.S. Cl. | 198/202 |
| [51] | Int. Cl. | B65g 15/64 |
| [50] | Field of Search | 198/137, 165, 202; 226/172 |

[56] References Cited
UNITED STATES PATENTS

| 870,134 | 11/1907 | Sargent | 226/172X |
| 2,578,592 | 12/1951 | Pile | 198/137 |

*Primary Examiner*—Robert G. Sheridan
*Attorney*—Fay, Sharpe & Mulholland

ABSTRACT: An edge guide for an endless wire conveyor belt including an endless chain having a wide wear surface for contact with the conveyor belt. The chain is supported by two spaced sprockets mounted on a base plate which is journaled about a shaft fixed approximately equidistant from the sprockets. An upstanding guide flange adjacent one edge of the base plate engages the back of the endless chain and limits lateral displacement; rollers on the chain are adapted to engage the flange in rolling contact.

INVENTOR.
JOHN D. CURRAN

BY

*Fay, Sharpe & Mulholland*

ATTORNEYS

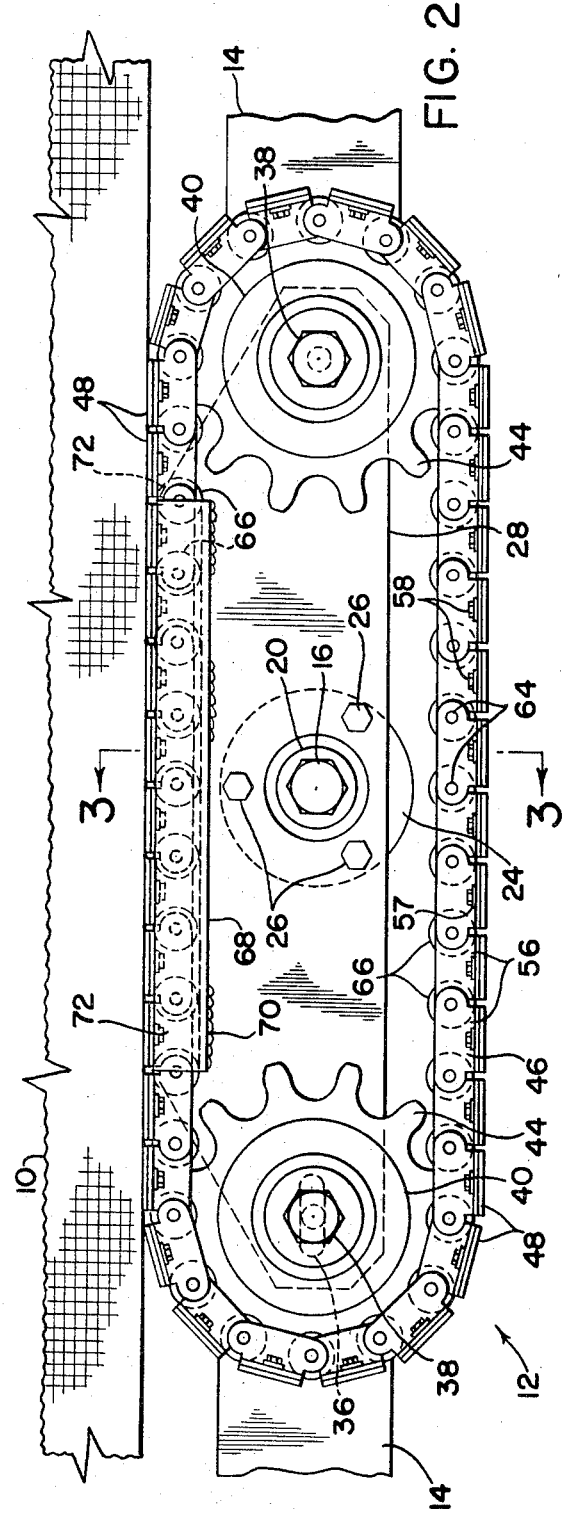
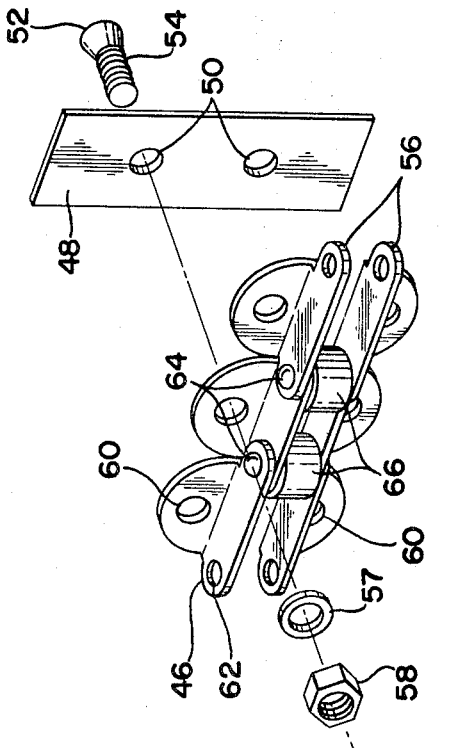
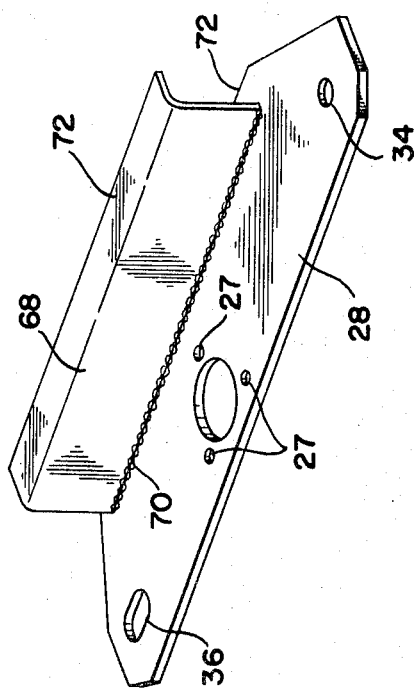

BELT GUIDE

BACKGROUND OF THE INVENTION

Conventionally, conveyor belts are driven by a pulley drum and supported throughout their length by rollers. When the belt is loaded with material, the load often tends to be unsymmetrically arrayed causing the belt to track laterally in one direction or the other. Without some means for guiding the edge of the belt and preventing the lateral tracking, the belt will move to one side and eventually roll off the drive pulley.

A variety of techniques and mechanisms have been used to attempt to overcome this side travel. One mechanism is a long cylindrical side roller rigidly mounted along each side of the belt to maintain it within acceptable lateral limits. This is an unacceptable technique in that, with heavy tension loading of the belt, the side thrust on the roller will tend to be very great, with a resulting high degree of wear along the edges of the belt. Often these belts have weld connections at the edges and the edges are usually under the greatest stress. Thus, the physical block exerted by the rigidly mounted side roller to limit side travel of the belt, rather quickly wears on the edge and makes replacement of the belt a frequent occurrence.

Another technique which is used is a laterally movable pulley drum which is triggered by side contacts. In this mechanism the side tracking of the belt trips a switch which moves the pulley in the opposite direction of the tracking, thus, attempting to realign the belt. The result is a constant back and forth movement of the pulley as the device "hunts" for a proper aligning.

A variation of the "hunting" technique is to have the side detection devices trigger a variable angle of the pulley which contemplates realignment of the belt by variation of tension across the belt. In this type of system when the belt moves in one direction and triggers the angular deflection of the pulley, the unavoidable "hunting" results in a periodic tensioning and relaxation of the edges of the belt which is, in and of itself, a contribution to the inevitable destructive wear.

BRIEF DESCRIPTION OF THE INVENTION

It was conceived that a proper structure for guiding the belt would be one of moving line contact with the edge of the belt over an extended length. This would eliminate the undesirable point contact between metal surfaces occasioned by the side rollers and thereby minimize the frictional wear of the belt.

Thus, it was decided that an endless roller chain located along the sides of the conveyor belt would be a proper solution to the problem. The resulting endless roller chain consists of a plurality of wide bearing plates fixed together by pivot pins and with roller bearings on the back or inner surface of the chain at some of the pivot points. The chain is supported by spaced sprockets mounted on a base plate which is journaled about a shaft located approximately equidistant between the sprockets. The chain circumscribes the base plate and along one edge of the plate is a guide flange for engaging the rollers to provide rolling planar contact between the chain and the flange.

An object of this invention is to provide an edge guide for endless conveyor belts with a moving line contact between the belt and the guide.

Another object of this invention is to provide an edge guide for an endless wire conveyor belt which provides a moving line contact with the belt wherein the guide is of a material softer than the belt.

Another object of this invention is to provide an edge guide for an endless conveyor belt which provides line contact along the edge of the belt by a wear surface located substantially in a single plane.

Other objects of this invention will be obvious from a study of the detailed description of the invention.

BRIEF DESCRIPTION OF THE DRAWINGS

FIG. 2 is a plan view of the belt guide;

FIG. 4 is a perspective view of the flange and the base plate; and

FIG. 5 is an exploded view of a single link in the chain of the belt guide.

PREFERRED EMBODIMENT

Figure 1:
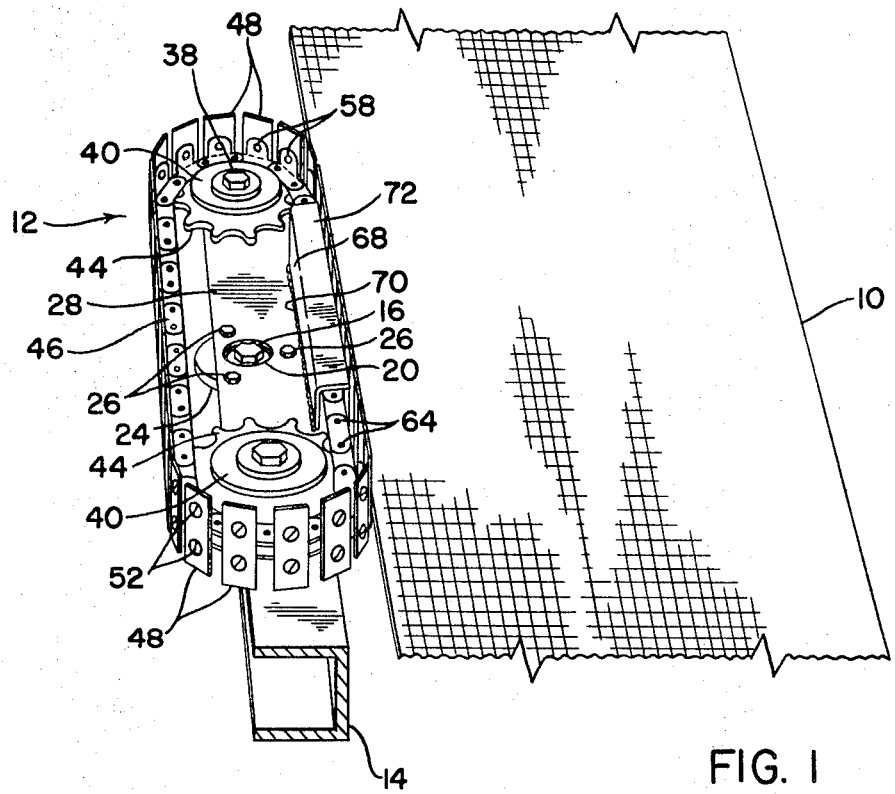
FIG. 1 is a perspective view of the spiral belt guide in operating position adjacent a moving belt.

A spirally wound wire conveyor belt 10 is shown schematically in FIG. 1 with a belt guide 12 along one edge. Belt guide 12 is supported on a reinforcing channel 14 by a bolt 16 and held in place by a nut 18, best seen in FIG. 3. Other means for locking the belt guide in place adjacent the belt 10 may be employed, as desired, for example a clamp or clamps.

Bushings 20 and 22 surround the upstanding bolt shaft 16 and hold a support plate 24 in position to pivot freely about the shaft 16. Capscrew 26 extend through apertures 27 in a base or mounting plate 28 and thread into openings in the support plate to rigidly fix them together.

Extending through the base plate 28 near each end are apertures 34 and 36. As may be observed in FIG. 4, the aperture 36 is elongated as compared to the aperture 34. Both apertures are intended to receive spindles 38; the elongation is to allow for adjustment of one spindle relative to the central shaft 16 and for purposes of tightening or loosening the tension in the chain 46. The spindles 38 may be bolts, as illustrated, or any other convenient rigid support means. Each bolt 38 is circumscribed by a set of bushings 40 and 42 which hold a sprocket 44 in alignment above the base plate 28.

Figure 3:
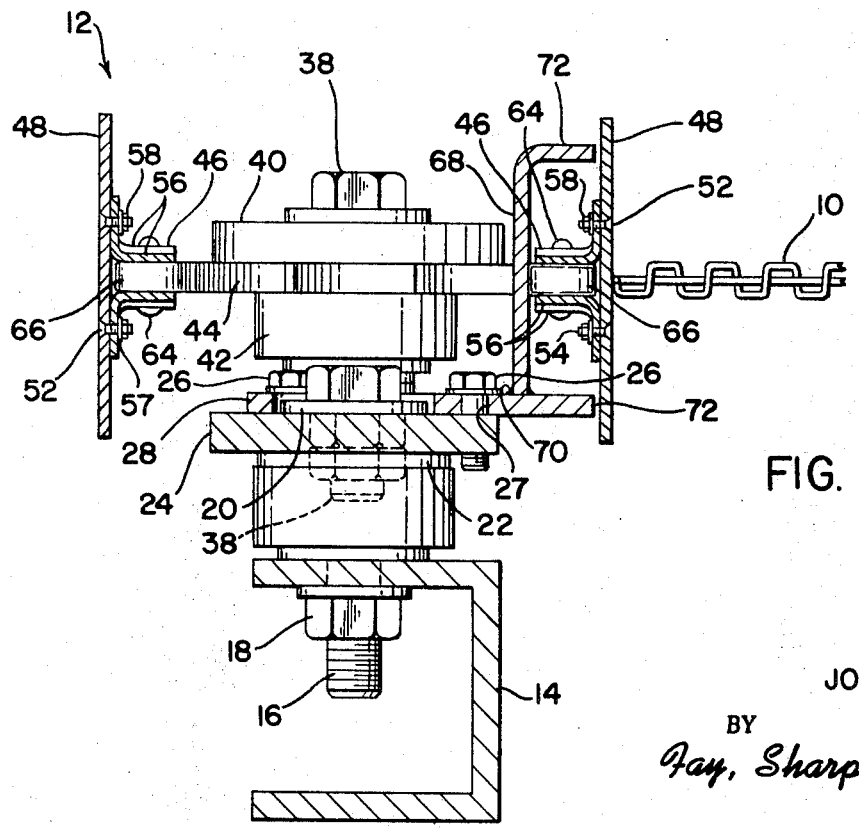
FIG. 3 is a sectional elevational view of the belt guide taken along line 3-3 of FIG. 2.

The sprockets 44 serve as free-rotating supports for an endless roller chain 46 which includes a plurality of pivoted links. As best seen in FIG. 5, each link consists of a bearing plate 48 having two openings 50 therethrough. The openings 50 are countersunk to receive the head 52 of a screw 54; thereby the bearing surface of the plate will present a substantially flat surface to the edge of the wire belt 10. Side bars 56 are bolted to the bearing plate 48 by means of the screw 54 and a washer 57 and nut 58. Each side bar 56 includes three apertures, one aperture 60 for receiving the screw 54 and two apertures 62 for receiving a pivot pin 64 which serves to lock the links of the chain 46 together. Circumscribing at least some of the pivot pins 64 are roller bearings 66 which rotate freely about the pins 64. A sectional view of the connection between the side bars 56 and the bearing plates 48 is illustrated in FIG. 3.

In operation the spirally wound belt 10, when properly aligned, will move between a pair of belt guides 12, not contacting either one. Upon a side tracking of the belt 10 in either direction, it will contact one of the guides 12. Because the sprockets 44 are supported on the relatively friction free bushings 40 and 42, the belt 10 will begin to turn the chain 46 due to frictional engagement between the bearing surfaces of the bearing plates 48 and the edge of the belt. Because the pivot or shaft 16 supporting the base plate 28 is substantially equidistant from the shafts 38 supporting the sprockets, the base plate will automatically pivot and shift position to align the wear surface portion of the roller chain in a plane with the edge of the wire belt. And because the roller chain 46 is thus aligned, it will provide moving line contact with the edge of the wire belt 10. In this manner, any point stress contact is eliminated and belt wear due to sliding friction is much reduced.

It is important to note that side pressure from the wire belt 10 will be substantially equally distributed along most of the length of the belt guide 12 between the spindles 38. Thus, a planar support is needed as a backing for the chain 46 between the spindles 38. This is supplied by a coaction of the bearing plates 48, rollers 66 and a guide flange 68, best illustrated in FIG. 3. The guide flange 68 is welded at 70 along one side of the base plate 28. This provides a limit on the side tracking of the wire belt 10 and the free-rotating rollers 66 insure substantially friction-free, rolling contact between the surface of the flange 68 and the bearing plate 48.

As is obvious from FIG. 3, when the wire belt 10 is loaded it may be slightly above or below the centerline of the roller 66 and thus belt-chain contact will tend to tilt the bearing plate 48. To prevent this problem, stabilizing extensions 72 are provided.

One important aspect of the moving line contact between the wire belt 10 and the roller chain 46 is an increased useful life for the wire belt, the wire belt being by far the most expensive device involved. While there is very little sliding friction between the belt 10 and the roller chain 46, any contact between metal surfaces tends to wear the surfaces. Thus, the bearing plates 46 are made of a softer material than the wire belt 10, brass and plastic are the preferred materials. It is contemplated that it may be more economical to have only the center part of the bearing plate 48 of the softer material, with an end and backing portion of a harder material to provide reinforcing strength.

As can be seen, the prime wearing part of the belt guide 12 is the bearing plate 48. These plates may be replaced by simply removing the screws 54 and bolting a new one in place.

It has been found during experiments that the guide 12 is most effective when placed about one to five times the width of the belt 10 away from the traction drive drum, and preferably two to three times the width of the belt from the traction drive drum.

For ease of description the principles of the invention have been set forth in connection with but a single illustrated embodiment. It is not intended that the illustrated embodiment nor the terminology employed in describing it be limiting, inasmuch as variations may be made by one having ordinary skill in the art without departing from the scope and spirit of the invention. Rather it is intended that any restrictions on the invention be limited only by the spirit and scope of the appended claims.

I claim:

1. An edge guide for an endless wire conveyor belt comprising an endless chain with an outwardly facing wear surface, said chain being supported on spaced and aligned sprockets;

means for supporting the sprockets and pivot means approximately equidistant from the centers of the sprockets for allowing automatic shifting of a portion of the wear surface into a single plane substantially parallel with the edge of a moving conveyor belt upon engagement between the belt and the wear surface.

2. The guide of claim 1 wherein the chain includes a plurality of flat plates with one surface of each plate comprising part of said wear surface.

3. The guide of claim 2 wherein the sprocket support means includes a base plate journaled about a shaft, the shaft comprising said pivot means.

4. The guide of claim 3 including a guide flange fixed to the base plate and projecting into an area encompassed by the endless chain substantially parallel with said single plane.

5. The guide of claim 4 including spaced stabilizing extensions extending from the base plate and the flange toward the wear surface adjacent the wire belt to limit tilting of the wear surface.

6. The guide of claim 4 wherein the plates are pivotally secured together to form the endless chain with the pivot point between at least some pairs of plates including a roller bearing for engaging the flange.

7. The guide of claim 1 wherein the portion of the chain adapted to contact the belt is of softer material than the belt.

8. The guide of claim 2 wherein the flat plates are at least partially of a material softer than the belt.

9. The guide of claim 1 wherein the sprocket support means includes a base plate journaled about a shaft, the shaft comprising said pivot means.

10. The guide of claim 1 including a guide flange fixed to the base plate and projecting into an area encompassed by the endless chain substantially parallel with said single plane.

11. The guide of claim 10 wherein the chain includes a plurality of flat plates with one surface of each plate comprising part of said wear surface.

12. The guide of claim 11 wherein the plates are pivotally secured together to form the endless chain with the pivot point between at least some pairs of plates including a roller bearing for engaging the flange.

13. The guide of claim 10 including spaced stabilizing extensions extending from the base plate and the flange toward the wear surface adjacent the wire belt to limit tilting of the wear surface.